April 11, 1939.  J. W. OSTEN  2,153,772
RADIATER COVER AND SCREEN FASTENER
Filed Jun 1, 1937
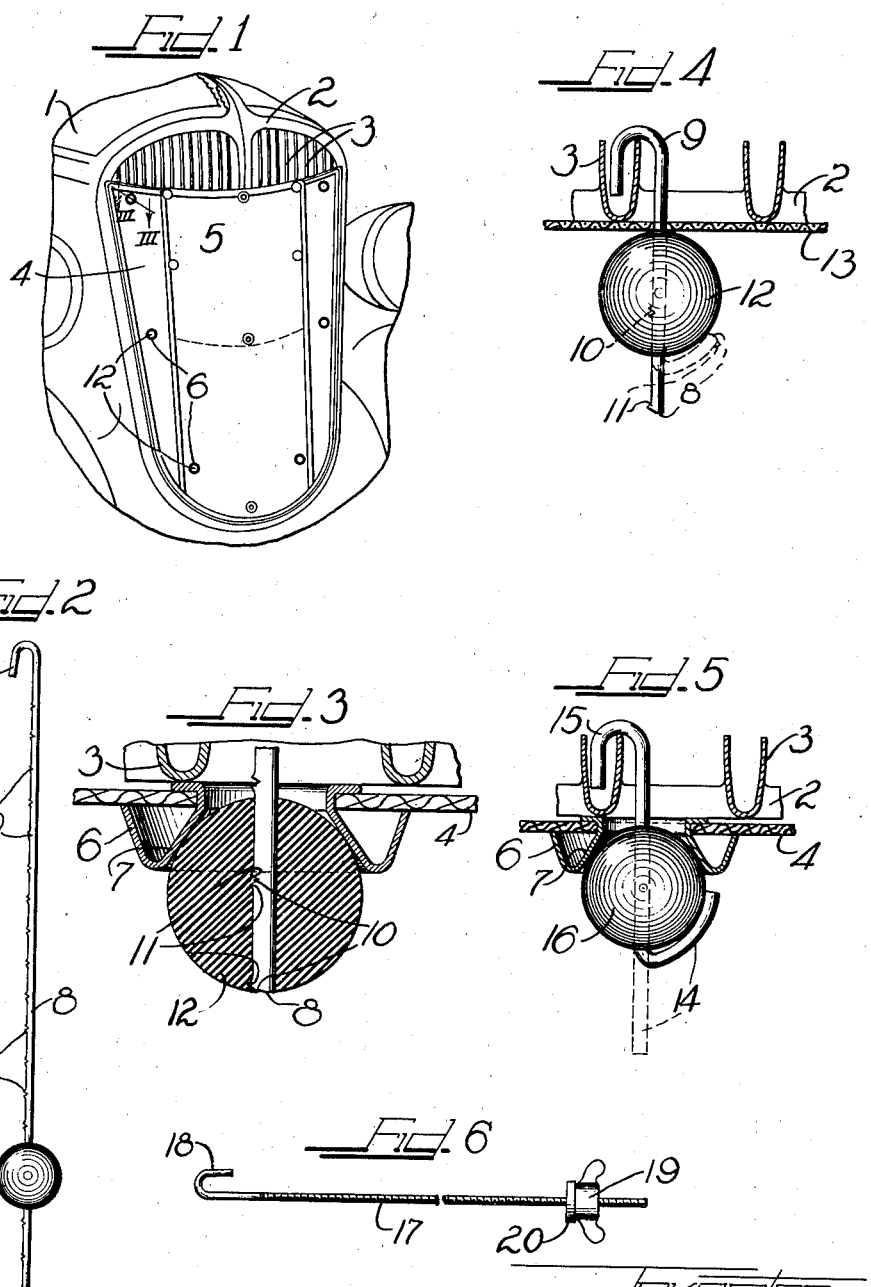
Joseph W. Osten Patented Apr. 11, 1939

2,153,772

UNITED STATES PATENT OFFICE 2,153,772

RADIATOR COVER AND SCREEN FASTENER

Joseph W. Osten, Wilmette, Ill.

Application June 1, 1937, Serial No. 145,643

3 Claims. (Cl. 85—5)

The present invention pertains to fasteners or holders for releasably securing radiator covers and radiator screens on the grilles of automobiles. The improved fasteners are adapted to be engaged through eyes in the radiator covers or through openings in the screen mesh of screens, the said fasteners being provided with hooked ends for engagement behind the grille bars, while the stems of the fasteners project outwardly and are notched or serrated and have passaged rubber retaining balls frictionally engaged thereon, permitting the same to be frictionally pushed over the stems into contact with the radiator covers or screens to rigidly hold the same in place. It is intended to have the unused projecting ends of the fastener stems broken off at one of the notches adjacent the ball holders, or if plain stems are used, the projecting ends of the stems are cut off leaving short lengths to be bent over around the exterior of the balls to clamp the same in place.

It is an object of this invention to provide radiator cover and screen fasteners of simplified and inexpensive construction consisting of a wire stem hooked at one end and provided with spaced notches leaving projecting burrs for lockingly engaging a passaged rubber retaining ball frictionally engaged on the stem for movement into a clamping position against a radiator cover or screen when the fastener is in position hooked on a radiator grille bar.

It is also an object of this invention to provide a radiator cover and screen fastener including a hooked stem provided with spaced burrs aligned along one side of the stem for locking engagement with a passaged rubber retaining ball which is slidable on the stem with the exertion of force to overcome the locking engagement of the burrs with the walls of the ball passage.

Another object of the invention is the provision of simplified forms of fasteners for holding radiator covers and screens on automobile grilles, said fasteners consisting of hooked wire stems having retaining balls or knobs slidably engaged thereon permitting the projecting unused portions of the stems to be broken off or bent over after the retaining balls are moved into holding position seating against the exterior surfaces of either radiator covers or screens.

It is an important object of this invention to provide a radiator cover and screen retaining device consisting of a hooked wire body having a retaining member slidably engaged thereon and slidable into a clamping position into engagement with a radiator cover or screen to hold the same clamped against a radiator.

Other and further important objects of this invention will be apparent from the disclosures in the specification and the accompanying drawing.

The invention (in preferred forms) is illustrated in the drawing and hereinafter more fully described.

On the drawing:

Figure 1 is a fragmentary isometric view of the front end of an automobile having a radiator cover engaged in position on the radiator grille by means of improved fasteners embodying the principles of this invention.

Figure 2 is a plan view of the improved radiator cover and screen fastener showing the passaged rubber ball near one end of the fastener stem.

Figure 3 is an enlarged fragmentary detail section taken on line III—III of Figure 1 illustrating the retaining ball moved into clamping or holding position seated in an eye forming a part of the radiator cover.

Figure 4 is an enlarged fragmentary sectional view similar to Figure 3, but showing the fastener hooked to a radiator grille bar with the clamping ball engaged against an insect screen to clamp it in place to cover the radiator grille.

Figure 5 is an enlarged fragmentary sectional view similar to Figure 3, illustrating in elevation a modified form of fastener using a plain wire stem which is adapted to have the end thereof bent over around the ball when the ball is moved into a clamping position for holding a radiator cover or screen clamped in place against a radiator grille.

Figure 6 is a plan view of another modified form of cover fastener using threaded fastening means.

As shown on the drawing:

Referring to Figures 1 to 3 inclusive, the reference numeral 1 indicates an automobile hood, the front end of which is enclosed by means of a radiator grille 2 provided with grille bars 3. At different seasons of the year it has been the practice to partially close or cover the radiator grille. In winter, for example, it has been desirable to retain the engine heat within the automobile hood and prevent cold air, in excessive quantities, from entering through the grille to obviate freezing of the water in the engine cooling system.

As a means for keeping out the cool air in the winter time, removable radiator covers have been provided on the front of the grille, to cover the major portion of the grille. As illustrated in Figure 1, a radiator cover 4 is engaged against the outer face of the grille 2. The radiator cover 4 is provided with an adjustable flap or apron 5 which may be partially opened or entirely opened to uncover greater portions of the grille. The marginal portion of the radiator cover is provided with a plurality of spaced eyelets or rings 6, each of which is provided with a bevelled seat portion 7. The eyes 6 are rigidly clamped to the material forming the cover 4 and provide openings through the cover for the reception of the improved holders or fasteners of this invention.

As clearly illustrated in Figure 2, the improved holder or fastening device comprises a long wire body stem 8, one end of which is bent over to provide an engaging hook 9. The length of the stem of the fastener is made of a length ordinarily longer than that required so that the body portion of the fastener may be fitted to various types of automobile radiator grilles. The stem 8 along one side thereof is provided with a row of spaced notches or serrations 10 which leave projecting burrs 11 which serve as latching or locking means for releasably holding a retaining knob or bulb 12 in a position of adjustment on the stem. The bulb 12 is constructed of rubber or other suitable material and is provided with a diametric passage slightly less in diameter than the diameter of the stem 8 so that the projecting burrs 11 project slightly into the walls of the passage of the ball to hold the rubber ball locked in a set position of adjustment on the stem 8 but still permitting the ball to be frictionally moved by force in either direction longitudinally on the stem.

To engage one of the improved holders or fasteners in position for holding a portion of the cover 4 against the grille bars 3 it is only necessary to project the hooked end 9 of the fastener through one of the eyes 6 and engage the hook 9 in back of one of the grille bars 3. The projecting end of the stem 8 is then held tight, and the rubber ball 12 is frictionally pushed inwardly on the stem 8 until the ball seats on the seat 7 of the eye 6, as clearly illustrated in Figure 3, to hold a portion of the radiator cover 4 clamped in position against the grille bars. After the ball has been moved into its locking position to hold the cover in place, the projecting portion of the notched stem 8 is bent over and broken off at one of the notches 10 nearest the outer side of the ball 12, thereby leaving only a small portion of the stem projecting beyond the ball. It will be found that if the passaged ball fits too snugly on the stem 8 that the ball may be moved by rotating the same on the stem, as the burrs 11 serve as thread means permitting the ball to be screwed further onto the stem 8 or outwardly toward the end of the stem.

After the required number of fasteners are engaged through the eyes 6 of the radiator cover, the cover is releasably held in position until the cover is no longer necessary. To remove the cover from the radiator grille, it is only necessary to pull the balls 12 off of the ends of the fastener stems 8 thereby permitting the hooked ends of the stems to be disengaged from the grille bars 3. In case the stems are long enough for re-use, they may be saved to permit the balls 12 to be re-engaged on the ends thereof when it is desired to again mount the radiator cover in place. In case the stems are too short, it will of course be understood that new stems may be provided and either the old balls or the new ones may be used. The improved fasteners including the hooked stems and the rubber balls may be provided at such slight cost that new fasteners may be used each time the cover is mounted in position which is usually only once during a season.

Figure 4 illustrates the improved fastener associated with a radiator grille for holding an insect screen 13 removably clamped in position against the grille bars 3. These screens are usually used in summer months to cover the entire grille so that insects and the like are prevented from entering through the grille to plug up the radiator openings. The insect screen 13 is mounted in the same manner as the radiator cover, with the exception that in the insect screen 13 it is not necessary to provide the eyelets 6 for the reason that the mesh openings are sufficient to permit engagement of the end of the hook 9 through the screen by slightly manipulating the same, after which the hooked end of the stem may be engaged behind a grille bar 3 and the retaining ball 12 may be slidably removed on the stem until it seats against the wire screen 13 to hold the same clamped in place. The projecting end of the stem 8 is then bent over and broken off at the notch nearest to the ball 12.

In the form of the fastener shown in Figure 4, the stem has the notches 10 separated at greater distances, so that when the ball is moved into a clamping position, the stem may be broken off at the first notch beyond the ball, leaving a surplus stem end sufficient to be bent over and seat around the ball, as illustrated in dotted lines in Figure 4, to hold the ball in place. This arrangement permits the outer bent over end of the stem to be straightened out, when it is desired to remove the screen, and permits removal of the ball and re-use of the fastener stem and ball. When stems with widely separated notches are used, as shown in Figure 4, the balls 12 may be constructed of wood, hollow metal or any other suitable material.

Figure 5 illustrates a modified form of fastener or holder for retaining either radiator covers or insect screens on the grilles of automobiles. The modified form of fastener comprises a wire stem 14, one end of which is bent to form an engaging hook 15 for engaging a radiator grille bar 3. A wooden or hollow metal ball 16 is slidably engaged on the smooth wire stem 14 and is pushed inwardly on the stem until it seats on the seat 7 of the eyelet 6. The outer end of the stem 14 is then cut off leaving a short portion which is then bent over and around the ball 16 as illustrated in full lines in Figure 5 to hold the ball tightly seated in the eyelet or socket to hold the cover 4 clamped in position against the radiator griller bars 3.

When a hollow metal ball 16 is used, the openings in the ball may be teardrop shaped or tapered at one side so that when the projecting length of the stem is bent over, the stem may be forced or wedged into the tapered end of the opening to lock the ball and stem together. The surface of the stem may be slightly grooved or roughened to permit of a better locking engagement between the stem and the tapered slot in the ball when the projecting end of the stem is bent over.

Figure 6 illustrates another modified form of holder or fastener comprising a threaded stem 17 having a hook 18 integrally formed on one end thereof. Adjustably threaded on the straight end of the threaded stem 17 is a speed or wing nut 19 for coaction with a washer 20 which is mounted on the threaded stem 17 between the hook 18 and the wing nut 19. In this modified form of fastener, the threaded stem 17 may be provided in a required length for engagement with a particular make of radiator grille, or if long stems 17 are provided, the projecting unused portions of the stems may be cut off after the washers 20 and wing nuts 19 have been moved into clamping position to hold either a radiator cover or an insect screen clamped in position against a radiator grille.

It will, of course, be understood that numerous details of construction may be varied through a wide range without departing from the principles of this invention, and it is, therefore, not the purpose to limit the patent granted hereon otherwise than necessitated by the scope of the appended claims.

I claim as my invention:

1. A radiator grille cover fastener comprising a hooked stem member, having spaced notches along the length thereof forming projecting burrs, and a passaged clamping member slidably adjustable on the stem member for coaction with the burrs to hold the clamping member releasably locked in a set position of adjustment on the stem member.

2. A grille cover fastener comprising a wire stem having a hook integrally formed on one end thereof, said stem having a plurality of spaced notches along the length thereof leaving latching burrs projecting from the stem, and a passaged hard rubber ball frictionally adjustable on the stem in releasable latching engagement with the projecting burrs, said stem adapted to be broken off at the notch nearest the outer end of the ball after the ball has been moved into selected position of adjustment on the stem.

3. A radiator grille cover fastener comprising a hooked member having spaced notches and projections provided thereon, and an elastic member slidably adjustable thereon with the projections cutting into the elastic member and having the material forming the elastic member expansible into the notches for locking the elastic member in selected position of adjustment on the stem.

JOSEPH W. OSTEN.